(12) United States Patent
Lowe et al.

(10) Patent No.: US 9,367,439 B2
(45) Date of Patent: Jun. 14, 2016

(54) PHYSICAL MEMORY USAGE PREDICTION

(75) Inventors: Eric E. Lowe, Pflugerville, TX (US);
Blake A. Jones, Oakland, CA (US);
Jonathan William Adams, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1081 days.

(21) Appl. No.: 13/460,681

(22) Filed: Apr. 30, 2012

(65) Prior Publication Data
US 2013/0290669 A1 Oct. 31, 2013

(51) Int. Cl.
*G06F 12/00* (2006.01)
*G06F 12/02* (2006.01)

(52) U.S. Cl.
CPC .................. *G06F 12/0223* (2013.01)

(58) Field of Classification Search
None
See application file for complete search history.

(56) References Cited

U.S. PATENT DOCUMENTS

| | | | | |
|---|---|---|---|---|
| 7,000,087 B2* | 2/2006 | Atherton | ........... | G06F 12/08 711/170 |
| 7,496,711 B2* | 2/2009 | Bartley | ........... | G06F 12/08 711/117 |
| 7,657,584 B2* | 2/2010 | Kawamura | ........ | G06F 17/30312 707/610 |
| 7,707,379 B2* | 4/2010 | Bartley | ........... | G06F 13/161 711/100 |
| 8,375,191 B2* | 2/2013 | Kim | ........... | G06F 12/0246 711/170 |
| 8,850,156 B2* | 9/2014 | Yang | ........... | G06F 9/45558 711/170 |
| 9,009,715 B2* | 4/2015 | Ogasawara | ........... | G06F 9/526 707/819 |
| 2003/0084265 A1* | 5/2003 | Heller | ........... | G06F 12/023 711/170 |
| 2004/0168037 A1* | 8/2004 | Dearth | ........... | G06F 12/023 711/173 |
| 2005/0052463 A1* | 3/2005 | Hung | ........... | G06T 1/60 345/531 |
| 2006/0004977 A1* | 1/2006 | Jann | ........... | G06F 12/127 711/170 |
| 2006/0277389 A1* | 12/2006 | Hepkin | ........... | G06F 12/1027 711/203 |
| 2007/0011660 A1* | 1/2007 | Garyali | ........... | G06F 12/0269 717/127 |
| 2007/0118712 A1* | 5/2007 | van Riel | ........... | G06F 12/023 711/170 |

(Continued)

*Primary Examiner* — Charles Rones
*Assistant Examiner* — Matthew Chrzanowski
(74) *Attorney, Agent, or Firm* — Osha Liang LLP

(57) ABSTRACT

In general, in one aspect, the invention relates to a system that includes memory and a prediction subsystem. The memory includes a first memgroup and a second memgroup, wherein the first memgroup comprises a first physical page and a second physical page, wherein the first physical page is a first subtype, and wherein the second physical page is a second subtype. The prediction subsystem is configured to obtain a status value indicating an amount of freed physical pages on the memory, store the status value in a sample buffer comprising a plurality of previous status values, determine, using the status value and the plurality of previous status values, a deficiency subtype state for the first subtype based on an anticipated need for the first subtype on the memory, and instruct, based on the determination, an allocation subsystem to coalesce the second physical page to the first subtype.

20 Claims, 12 Drawing Sheets

(56) References Cited

U.S. PATENT DOCUMENTS

| | | | |
|---|---|---|---|
| 2007/0198802 A1* | 8/2007 | Kavuri | G06F 3/0605 711/170 |
| 2008/0059704 A1* | 3/2008 | Kavuri | G06F 3/061 711/117 |
| 2008/0177951 A1* | 7/2008 | Bartley | G06F 13/161 711/119 |
| 2008/0232456 A1* | 9/2008 | Terashima | G10L 19/24 375/240 |
| 2008/0301256 A1* | 12/2008 | McWilliams | G06F 12/0284 709/214 |
| 2010/0058015 A1* | 3/2010 | Tokoro | G06F 11/1456 711/162 |
| 2010/0223612 A1* | 9/2010 | Osisek | G06F 9/45558 718/1 |
| 2011/0107050 A1* | 5/2011 | Vengerov | G06F 12/0269 711/170 |
| 2011/0167236 A1* | 7/2011 | Orikasa | G06F 3/0608 711/165 |
| 2011/0246739 A1* | 10/2011 | Matsuda | G06F 3/0605 711/165 |
| 2011/0302386 A1* | 12/2011 | Arakawa | G06F 13/16 711/170 |
| 2012/0017042 A1* | 1/2012 | Matsui | G06F 3/0608 711/114 |
| 2012/0023300 A1* | 1/2012 | Tremaine | G06F 12/1009 711/162 |
| 2012/0191900 A1* | 7/2012 | Kunimatsu | G06F 12/0223 711/103 |
| 2013/0290669 A1* | 10/2013 | Lowe | G06F 12/0223 711/206 |
| 2015/0149514 A1* | 5/2015 | Kim | G06F 17/30339 707/812 |

* cited by examiner

PHYSICAL MEMORY USAGE PREDICTION

BACKGROUND

Computer memory is allocated to programs executing on the computer in units referred to as physical pages. Each physical page is mapped to one or more virtual pages that store data used by the program. Because memory on computer systems is constantly in short supply, one of the primary functions of modern computers is managing the allocation of physical pages to programs. This task can be made more complex as the types of memory requested differs from program to program, within a single program, and over time.

SUMMARY

In general, in one aspect, the invention relates to a system that includes memory and a prediction subsystem. The memory includes a first memgroup and a second memgroup, wherein the first memgroup comprises a first physical page and a second physical page, wherein the first physical page is a first subtype, and wherein the second physical page is a second subtype. The prediction subsystem is configured to obtain a status value indicating an amount of freed physical pages on the memory, store the status value in a sample buffer comprising a plurality of previous status values, determine, using the status value and the plurality of previous status values, a deficiency subtype state for the first subtype based on an anticipated need for the first subtype on the memory, and instruct, based on the determination, an allocation subsystem to coalesce the second physical page to the first subtype.

In general, in one aspect, the invention relates to a method for managing memory on a system. The method includes obtaining a status value indicating an amount of freed physical pages on the memory, wherein the memory comprises a first memgroup and a second memgroup, wherein the first memgroup comprises a first physical page and a second physical page, wherein the first physical page is a first subtype, and wherein the second physical page is a second subtype. The method further includes storing the status value in a sample buffer comprising a plurality of previous status values, determining, using the status value and the plurality of previous status values, a deficiency subtype state for the first subtype based on an anticipated need for the first subtype on the memory, and instructing, based on the determination, an allocation subsystem to coalesce the second physical page to the first subtype.

In general, in one aspect, the invention relates to a computer readable medium comprising instructions that, when executed by a processor, perform a method for managing memory on a system. The method includes obtaining a status value indicating an amount of freed physical pages on the memory, wherein the memory comprises a first memgroup and a second memgroup, wherein the first memgroup comprises a first physical page and a second physical page, wherein the first physical page is a first subtype, and wherein the second physical page is a second subtype. The method further includes storing the status value in a sample buffer comprising a plurality of previous status values, determining, using the status value and the plurality of previous status values, a deficiency subtype state for the first subtype based on an anticipated need for the first subtype on the memory, and instructing, based on the determination, an allocation subsystem to coalesce the second physical page to the first subtype.

Other aspects of the invention will be apparent from the following description and the appended claims.

DETAILED DESCRIPTION

Figure 1:
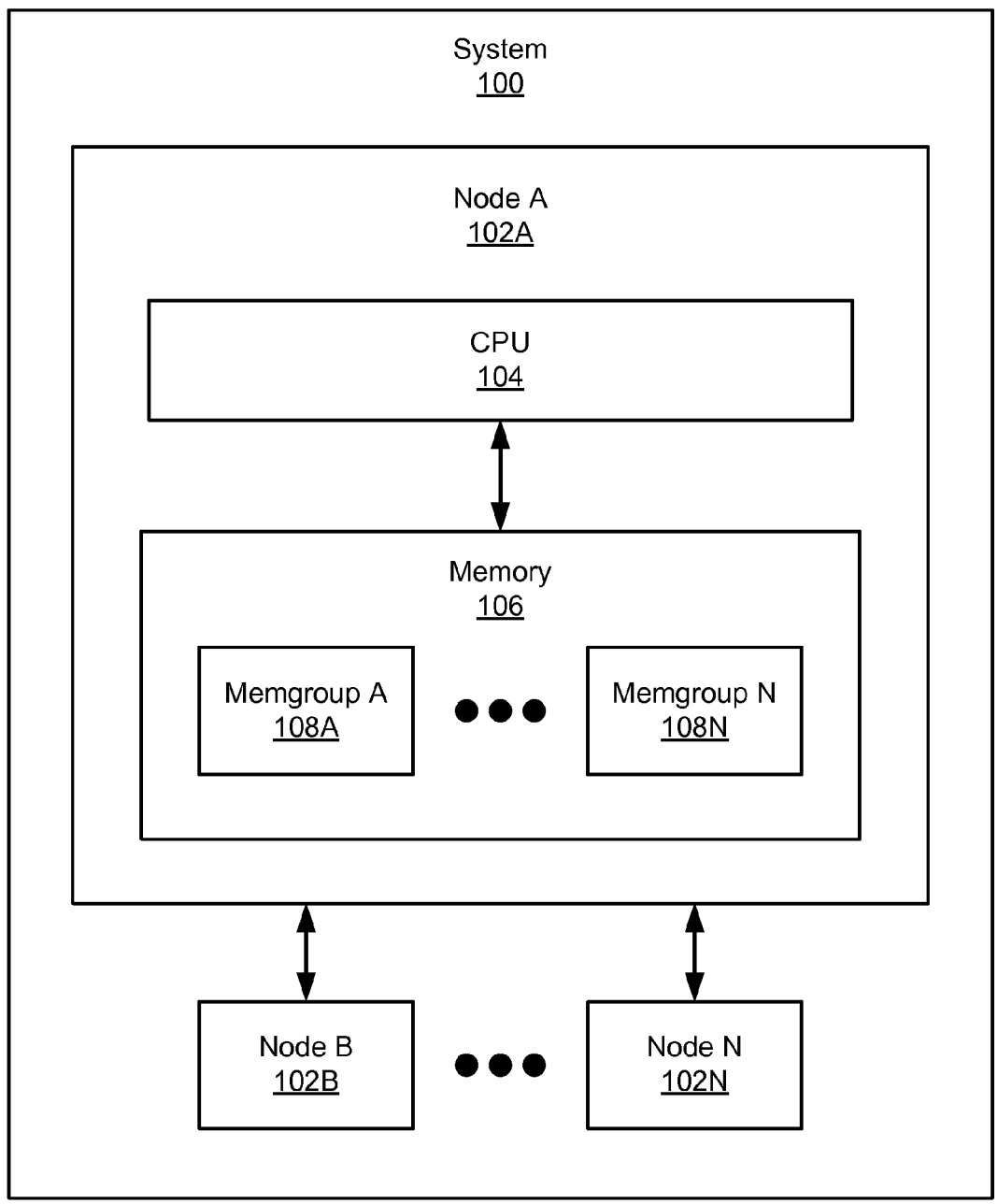
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for managing memory on a system. Specifically, embodiments of the invention may be used to manage memory by predicting future memory needs of processes executing on the system. Some computer systems organize regions of memory according to shared memory characteristics. In one or more embodiments of the system, such characteristics include the location on the system where the memory resides and the power management domain controlling power to the memory.

Different programs executing on the system may request physical pages of different sizes. For example, one program may request to use eight 16 kilobyte (kB) pages, and another program may request to use two 64 kB pages. In addition, the same program may request groups of physical pages with varying sizes.

In order to address the memory requirements of executing programs, the virtual memory manager (VMM) must be able to allocate physical pages matching the memory requests made by the programs. Because different programs have different needs, and different programs are executed at different times on a computer system, the VMM must coalesce or convert pages of one size into pages of another size.

However, coalescing physical pages may be an inefficient process. Further, when a program requests a physical page of a certain size, also referred to as a memory subtype, and there are no free pages of that size, the program must wait until the coalescing completes (or a matching page is freed) before the program may continue to execute.

Predicting the memory needs of a system may increase the overall efficiency of the system. For example, if the VMM predicts a deficiency of a certain subtype of memory, the VMM may then instruct a subsystem to begin generating pages of that subtype to cure the deficiency before a program is impacted.

FIG. 1 shows a diagram of a system in accordance with one or more embodiments of the invention. As shown in FIG. 1, the system (100) includes node A (102A) operatively connected to a plurality of nodes (node B (102B) and node N (102N)). Node A (102A) includes a central processing unit (CPU) (104) and a memory (106). The memory (106) includes multiple memgroups (memgroup A (108A), memgroup N (108N)). Each of the other nodes in the system (node B (102B), node N (102N)) may include substantially similar elements as those depicted in node A (102A).

In one or more embodiments of the invention, the system architecture depicted in FIG. 1 may operate as a system with non-uniform memory access (NUMA) architecture. In one or more embodiments of the invention, the links between the nodes (e.g., node A (102A), node B (102B), node N (102N)) may be implemented as a computer bus or data link capable of transferring data between nodes on a NUMA architecture system. Further, processes may execute on one node (e.g., node A (102A), node B (102B), node N (102N)) while accessing memory locations on a different node. Further, each node (e.g., node A (102A), node B (102B), node N (102N)) on the system may include only a CPU (104) without memory (106), or memory (106) without a CPU (104).

In one or more embodiments of the invention, memory (106) on a node is divided into memgroups (memgroup A (108A), memgroup N (108N)). In one embodiment of the invention, a memgroup (memgroup A (108A), memgroup N (108N)) is a group of memory units (e.g., memory cells, bits, bytes) on the system (100) that share memory characteristics. In one embodiment of the invention, all memory in a memgroup (memgroup A (108A), memgroup N (108N)) is located on a single node (e.g., node A (102A)). All memory in a memgroup may also be part of the same power management domain. Contiguous ranges of memory units within each memgroup (memgroup A (108A), memgroup N (108N)) may be organized into tilelets (not shown). As used herein, a contiguous range of memory, a contiguous region of memory, and contiguous pages of memory refer to a set of memory units in a sequence uninterrupted by other memory units that are not in the set.

Memgroups of physical memory may be divided into tiles of physical memory. Each tile of physical memory may represent a portion of the overall memory on the system. A tile may be further divided into tilelets, and each tilelet may include a number of pages of varying size. Further detail regarding memgroups is provided in FIG. 2.

Figure 2:
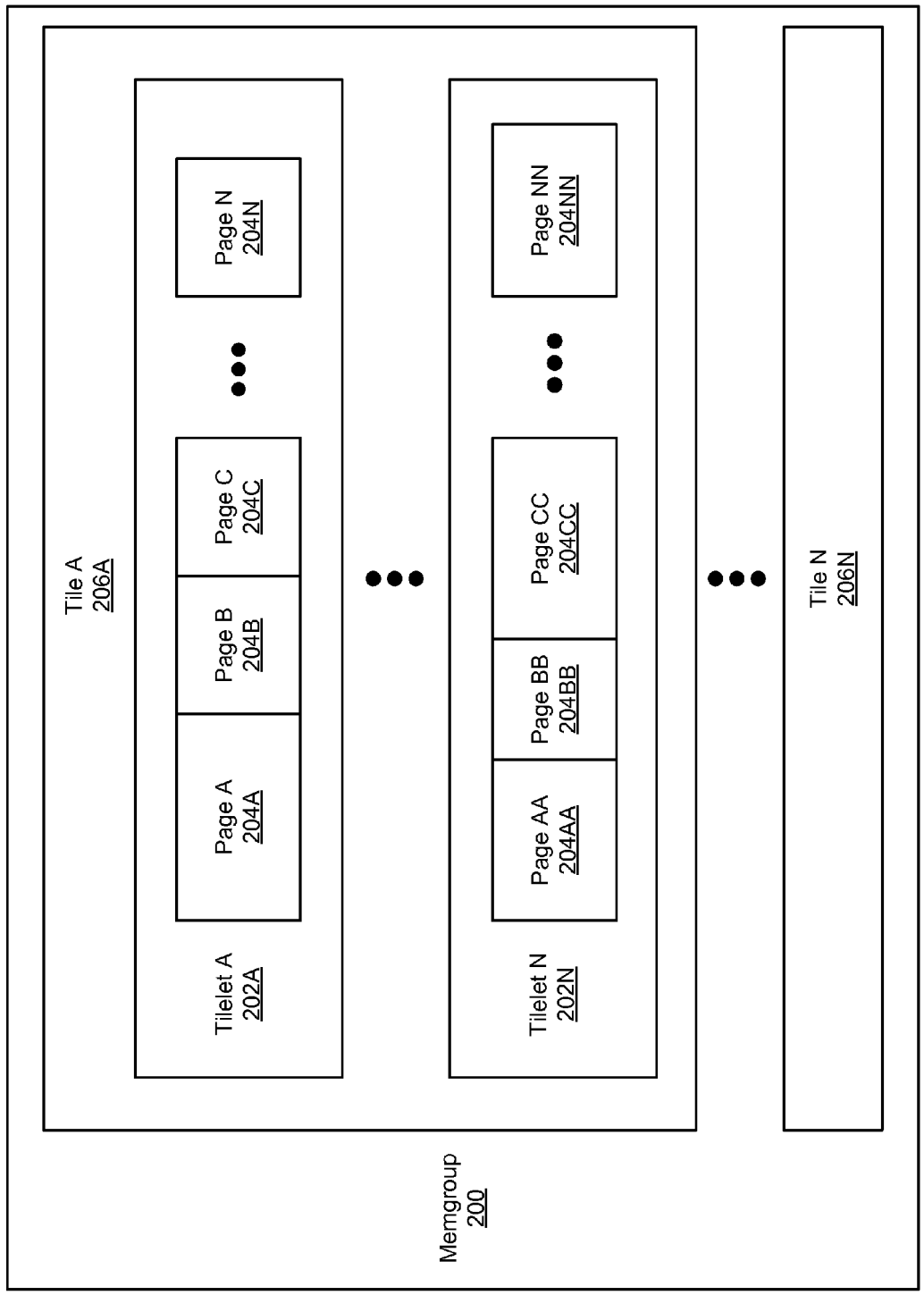
FIG. 2 shows a system in accordance with one or more embodiments of the invention.

FIG. 2 shows a diagram of a memgroup in accordance with one or more embodiments of the invention. As shown in FIG. 2, the memgroup (200) includes multiple tiles (e.g., tile A (206A) and tile N (206N)). Each tile (e.g., tile A (206A) and tile N (206N)) includes multiple tilelets (e.g., tilelet A (202A) and tilelet N (202N)). Each tilelet (e.g., tilelet A (202A) and tilelet N (202N)) includes multiple physical memory pages. As shown in FIG. 2, tilelet A (202A) includes page A (204A), page B (204B), page C (204C), and page N (204N). Tilelet N (202N) includes page AA (204AA), page BB (204BB), page CC (204CC), and page NN (204NN).

In one or more embodiments of the invention, a tilelet (e.g., tilelet A (202A) and tilelet N (202N)) is a contiguous region of memory within a memgroup (e.g., memgroup (200)). Each tilelet (e.g., tilelet A (202A) and tilelet N (202N)) is divided into physical pages (e.g. page A (204A), page B (204B), page C (204C), page N (204N), page AA (204AA), page BB (204BB), page CC (204CC), and page NN (204NN)) for allocation by the allocation subsystem within the VMM. Physical pages (e.g. page A (204A), page B (204B), page C (204C), page N (204N), page AA (204AA), page BB (204BB), page CC (204CC), and page NN (204NN)) on a single tilelet (e.g., tilelet A (202A) or tilelet N (202N)) may vary in size (e.g., 4 kilobytes (kB), 8 kB, 16 kB, etc). In one embodiment of the invention, the page size of a physical page may be referred to as the subtype of the physical page (also referred to as a page subtype). In one embodiment of the invention, a physical page (e.g. page A (204A), page B (204B), page C (204C), page N (204N), page AA (204AA), page BB (204BB), page CC (204CC), and page NN (204NN)) may be greater than the size of a tilelet (e.g., tilelet A (202A) and tilelet N (202N)). In such scenarios, a group of tilelets (e.g., tilelet A (202A) and tilelet N (202N)) may be organized into a single physical page.

In one or more embodiments of the invention, a page subtype may include other page metrics, either in addition to or instead of page size. Examples of other page subtypes include location, access speed, and reliability of the memory.

In one or more embodiments of the invention, pages no longer in use by a thread or by the VMM are freed physical pages. A freed physical page is a physical page that is no longer in use by any other part of the system, and may be reallocated to another thread or process requesting a physical page. In one or more embodiments of the invention, each freed physical page on the system (e.g. page A (204A), page B (204B), page C (204C), page N (204N), page AA (204AA), page BB (204BB), page CC (204CC), and page NN (204NN)) has a corresponding page data structure describing the size and location (e.g., node) of the page stored in the freelist. Page data structures may be organized into tile freelists. Tile freelists may be organized into memgroup freelists (see FIG. 3).

Figure 3:
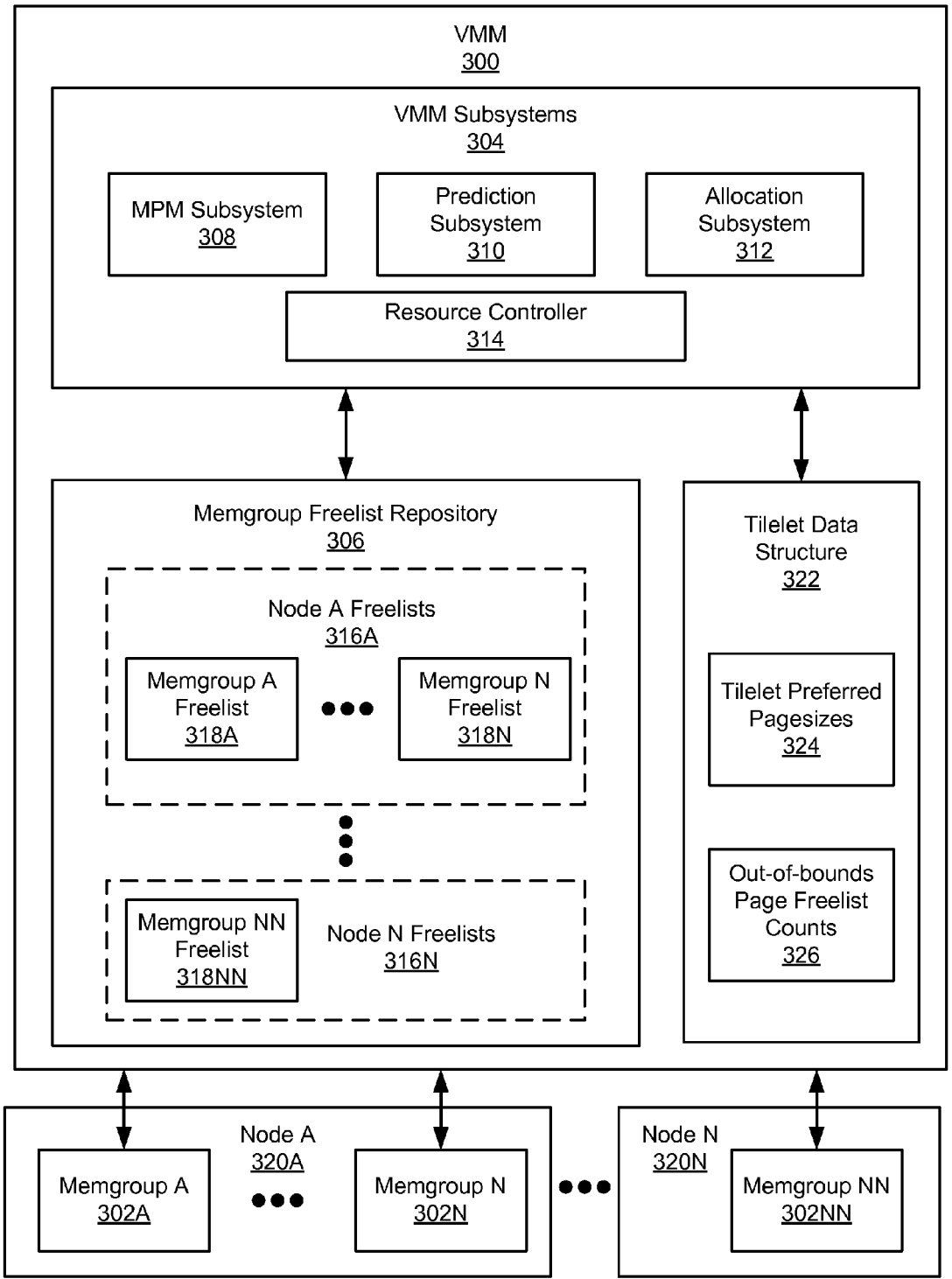
FIG. 3 shows a system in accordance with one or more embodiments of the invention.

FIG. 3 shows a diagram of a virtual memory manager (VMM) in accordance with one or more embodiments of the invention. As shown in FIG. 3, the VMM (300) is operatively connected to multiple memgroups (e.g., memgroup A (302A), memgroup N (302N), memgroup NN (302NN)). The VMM (300) includes VMM subsystems (304), a memgroup freelist repository (306), and a tilelet data structure (322). The VMM subsystems (304) include the memory power management (MPM) subsystem (308), the prediction subsystem (310), the allocation subsystem (312), and the resource controller (314). The memgroup freelist repository (306) includes a plurality of memgroup freelists (e.g., memgroup A freelist (318A), memgroup N freelist (318N), memgroup NN freelist (318NN)). The tilelet data structure (322) includes preferred tilelet pagesizes and out-of-bounds page freelist counts. Each memgroup freelist (e.g., memgroup A freelist (318A), memgroup N freelist (318N), memgroup NN freelist (318NN)) is associated with a node (e.g., node A (320A), node N (320N)).

In one or more embodiments of the invention, the memgroup freelist repository (306) stores lists of page data structures corresponding to freed physical pages of memory. The memgroup freelist repository (306) may be implemented as a set of list data structures in which a list is selected by node and page size. As shown in FIG. 3, page data structures on the memgroup A freelist (318A) and the memgroup N freelist (318N) correspond to memory pages located on node A (320A). Therefore, the memgroup A freelist (318A) and the memgroup N freelist (318N) are referred to as part of the node A freelists (316A). Similarly, memgroup NN freelist (318NN) corresponds to memory pages located on node N (320N). Therefore, page data structures on the memgroup NN freelist (318NN) are referred to as part of the node N freelists (316N).

In one or more embodiments of the invention, the MPM subsystem (308) is a program or group of programs that manage memory power. Specifically, the MPM subsystem (308) activates or deactivates memgroups according to a power management policy. In one or more embodiments of the invention, the resource controller (314) is a program or group of programs that interacts with the MPM subsystem (308) to measure the demand for memory on the system. The resource controller may also include functionality to determine whether to power down a memgroup based on the system topology and the utilization of the memgroup.

In one or more embodiments of the invention, the allocation subsystem (312) is a program or group of programs that responds to requests from the prediction subsystem (310) to adjust the subtype (e.g., page size) of freed physical pages on the system. Specifically, the allocation subsystem includes functionality to assign or reassign a preferred page size for a tilelet or a group of tilelets. Once a tilelet is assigned a certain page size, freed memory on that tilelet will be coalesced into pages of that size.

In one or more embodiments of the invention, the prediction subsystem (310) is a program or group of programs that determine the current and expected memory needs of the system. Specifically, the prediction subsystem analyses the recent usage patterns on the system, determines whether a deficiency of a memory subtype will occur, and instructs the allocation subsystem to generate pages to cure the deficiency. Further detail regarding the prediction subsystem is provided below in FIGS. 5-9.

In one or more embodiments of the invention, the VMM subsystems maintain a tilelet data structure (322) that includes preferred tilelet pagesizes (324) and out-of-bounds page freelist counts (326). In one embodiment of the invention, the preferred tilelet pagesizes (324) stores a number of tilelet preferred pagesizes (not shown) for tilelets on the system. The tilelet preferred pagesize specifies a physical page subtype (e.g., size) preference set by the allocation subsystem in response to a request by the prediction subsystem. In one or more embodiments of the invention, a system, or node on a system, may have a shortage or deficiency of pages of a certain subtype. In such cases, the tilelet preferred pagesize may be assigned to the deficient subtype. When freed physical pages on a system are coalesced, the tilelet preferred pagesize dictates the size (or other subtype) into which the pages are coalesced (or coalesced and subdivided).

In one or more embodiments of the invention, the out-of-bounds page freelist counts (326) stores an out-of-bounds page freelist count (not shown) for each tilelet on the system. Each out-of-bounds page freelist count indicates the amount of memory in the out-of-bounds page freelist for the associated tilelet. For each tilelet in each memgroup, the out-of-bounds freelist count tracks the total amount of current freed memory for all freed pages on the tilelet. The freed memory may be represented in terms of bytes of memory available (e.g., an out-of-bounds freelist count for a tilelet may be recorded as 256 kB of memory). Alternatively, in one embodiment of the invention, the amount of memory freed on each tilelet is tracked in terms of base pages. For example, if a system implements a base page of 4 kB, a 4 kB freed page on a tilelet will be reflected in the out-of-bounds page freelist count as 1. On the same system, a 4 megabyte freed page on a tilelet will be reflected in the out-of-bounds page freelist count as 1024. Accordingly, in the current example, a tilelet that includes one 4 kB page of freed memory and one 4 megabyte page of freed memory will have an out-of-bounds page freelist count of 1025.

Figure 4:
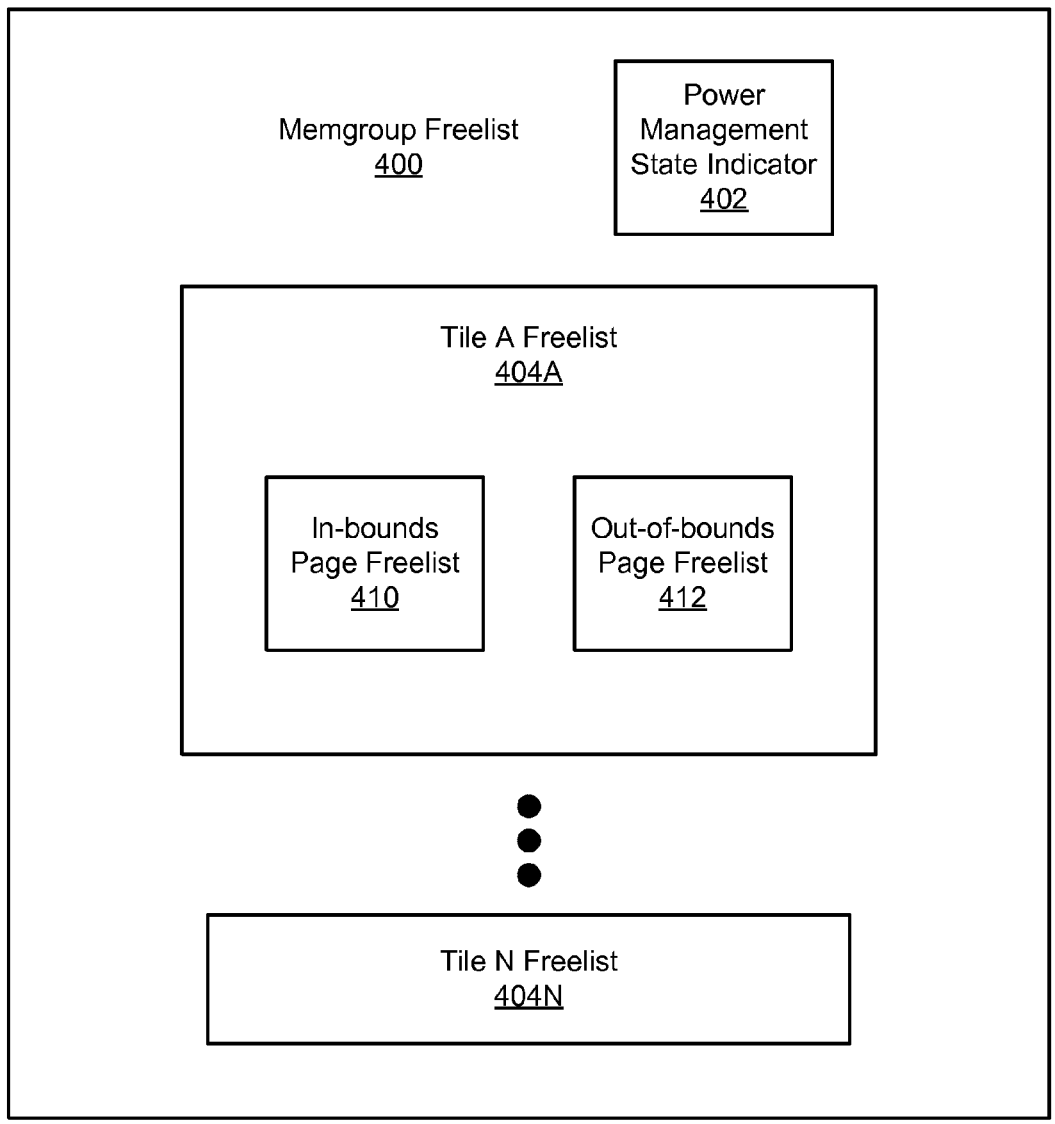
FIG. 4 shows a system in accordance with one or more embodiments of the invention.

FIG. 4 shows a memgroup freelist in accordance with one or more embodiments of the invention. As shown in FIG. 4, memgroup freelist (400) includes a power management state (402), and multiple tile freelists (e.g., tile A freelist (404A), tile N freelist (404N)). Each tile freelist (e.g., tile A freelist (404A), tile N freelist (404N)) includes an in-bounds page freelist (410), and an out-of-bounds page freelist (412). In one embodiment of the invention, the in-bounds page freelist (410) and the out-of-bounds page freelist (412) may each be implemented as a collection of lists.

In one or more embodiments of the invention, the in-bounds page freelist (410) is a list of freed physical pages that conform to the tilelet preferred pagesize. Specifically, the pages referenced in the in-bounds page freelist (410) are pages of a size that matches the value for the tilelet preferred page size in the preferred tilelet pagesizes (preferred tilelet pagesizes (324) in FIG. 3). In one or more embodiments of the invention, the out-of-bounds page freelist (412) is a list of physical pages that do not conform to the tilelet preferred pagesize. Specifically, the pages referenced in the out-of-bounds page freelist (412) are pages of a size that does not match the value for the preferred page size of their corresponding tilelets, as described in the preferred tilelet pagesizes. (preferred tilelet pagesizes (324) in FIG. 3).

In one or more embodiments of the invention, the power management state (402) indicates whether memory from the memgroup associated with the memgroup freelist (400) should be allocated to requesting processes and threads. Specifically, the power management state (402) may be used by the MPM subsystem to indicate that physical pages from a memgroup should not be allocated in preparation for powering down of the memgroup.

Figure 5:
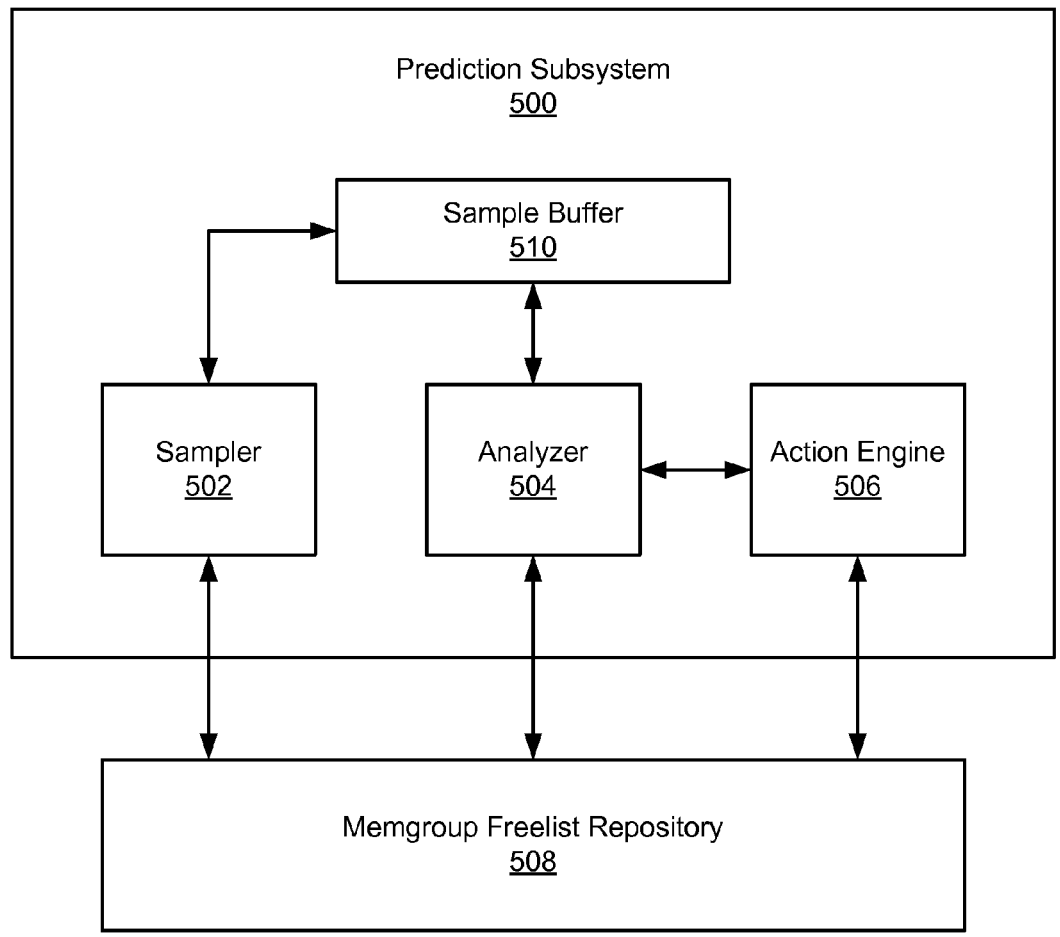
FIG. 5 shows a flow diagram in accordance with one or more embodiments of the invention.

FIG. 5 shows a prediction subsystem in accordance with one or more embodiments of the invention. As shown in FIG. 5, the prediction subsystem (500) includes a sampler (502), an analyzer (504), and an action engine (506). The sampler (502) interacts with a memgroup freelist repository (508) (e.g., memgroup freelist repository (306) in FIG. 3) to obtain a measurement of the available free memory on the system, and stores the measurement in the sample buffer (510).

In one or more embodiments of the invention, the sampler (502) is a process or group of processes configured to perform sampling to populate the sample buffer (510). In one embodiment of the invention, the sampler (502) queries the memgroup freelist repository (508) to obtain the current status of free memory on the system. Specifically, the sampler obtains a value or group of values representing the amount of freed physical pages on the system at time of the query. In one embodiment of the invention, the value or values obtained may further indicate the amount of freed physical pages of subtypes of memory. For example, an obtained value may indicate that there are 4,000 8 kB freed pages and 2,000 4 kB freed pages. The value may further indicate, for example, that 3,200 of the 4,000 8 kB freed pages are on the first node, 200 8 kB are on the second node, and 600 8 kb freed pages are on the third node. The value or values obtained may be referred to as status values.

In one or more embodiments of the invention, the status values are obtained periodically by the sampler (502) from the memgroup freelist repository (508). The status values may be obtained at regular intervals, such as, for example, once per second. In one embodiment of the invention, the interval at which the status values are obtained may vary depending upon the system utilization. For example, if the system is undergoing a period of higher utilization of memory, then the sampler (502) may be configured to reduce the interval between queries to the memgroup freelist repository (508).

In one embodiment of the invention, status values obtained by the sampler (502) are stored in the sample buffer (510). In one embodiment of the invention, the sample buffer (510) is a circular buffer that stores a series of status values in the order they were received from the sampler (502). In one embodiment of the invention, the sample buffer (510) is configured to store a series status values representing a historical record of memory usage on the system over a period of time. The record may represent, for example, memory usage on the system during the most recent thirty minute time period (i.e., thirty minutes before the current time). Further detail regarding the processes undertaken by the sampler (502) is provided in FIG. 6.

In one or more embodiments of the invention, the analyzer (504) is a process or group of processes configured to analyze the current contents (i.e., the series of status values) of the sample buffer (510). Specifically, the analyzer (504) may perform a statistical analysis on the status values in the sample buffer (510) to generate a value or set of values representing the anticipated memory usage. Examples of statistical analysis that may be performed on the status values in the sample buffer (510) may include, but is not limited to, pattern recognition, data mining, regression analysis, and time series analysis.

In one embodiment of the invention, the anticipated usage values may indicate an anticipated memory usage of each subtype of memory on the system. For example, the anticipated usage values may indicate that there will be a need for 4,000 8 kB freed pages and 2,000 4 kB pages on the system within the next 5 minutes. The value may further indicate, for example, that 3,200 of the 4,000 8 kB freed pages will be needed on the first node, 200 8 kB pages will be needed on the second node, and 600 8 kB pages will be needed on the third node.

In one or more embodiments of the invention, the analyzer (504) also includes functionality to determine anticipated availability of freed pages in a manner consistent with the process described above with regard to anticipated memory usage. Further, the analyzer may compare the anticipated usage to the anticipated availability of freed pages on the system to determine a state of the memory on the system. Further, this determined state of memory on the system may indicate states of each subtype of memory on the system (also referred to as a "subtype state").

In one or more embodiments of the invention, the anticipated usage values and anticipated availability are calculated by the analyzer (504) by using the rate of increase or decrease in need or availability between the status values in the sample buffer (510). For example, if the sample buffer (510) includes three status values, and the first status value indicates that three pages with a 8 kB subtype were available, the second status value indicates that two 8 kB pages were available, and the third status value indicates that one 8 kB pages was available, then the analyzer may anticipate that no 8 kB pages will be available during the next status value period.

In one or more embodiments of the invention, the analyzer (504) assigns one of five states to each subtype. A surplus subtype state indicates that more memory of the subtype exists on the system than is required by the running system workload. An in-bounds subtype state indicates that sufficient memory exists of the subtype such that it is unlikely the running system workload will require more of the subtype within the anticipated period of time. A deficit subtype state indicates that the running workload will soon (i.e., within the anticipated period of time) require more memory of the subtype than is currently available or predicted to be available. A shortage subtype state indicates that sufficient amounts of the subtype memory have not been provided, and one or more threads are currently blocked awaiting availability of memory of the subtype. Finally, a disabled subtype state indicates that memory of the subtype will not be able to be made available within the anticipated period of time. Said another way, a disabled subtype state indicates that the anticipated workload requirements for memory of the subtype exceed the ability of the system to provide the subtype memory. The disabled subtype state may be cured when the current workload requirements lessen, when memory is freed by a process, or when more memory is made active by the MPM subsystem. Further detail regarding the processes undertaken by the analyzer (504) in response to determining a subtype state is provided in FIG. 7.

In one or more embodiments of the invention, the analyzer (504) provides the subtype state and a value representing the deficiency (if any) to the action engine (506) for each memory subtype on the system. In one or more embodiments of the invention, the action engine (506) consumes the subtype state and deficit value, and executes an appropriate procedure to address the subtype state as necessary. Further detail regarding the procedures undertaken by the action engine (506) are described in FIGS. 8 and 9.

Figure 6:
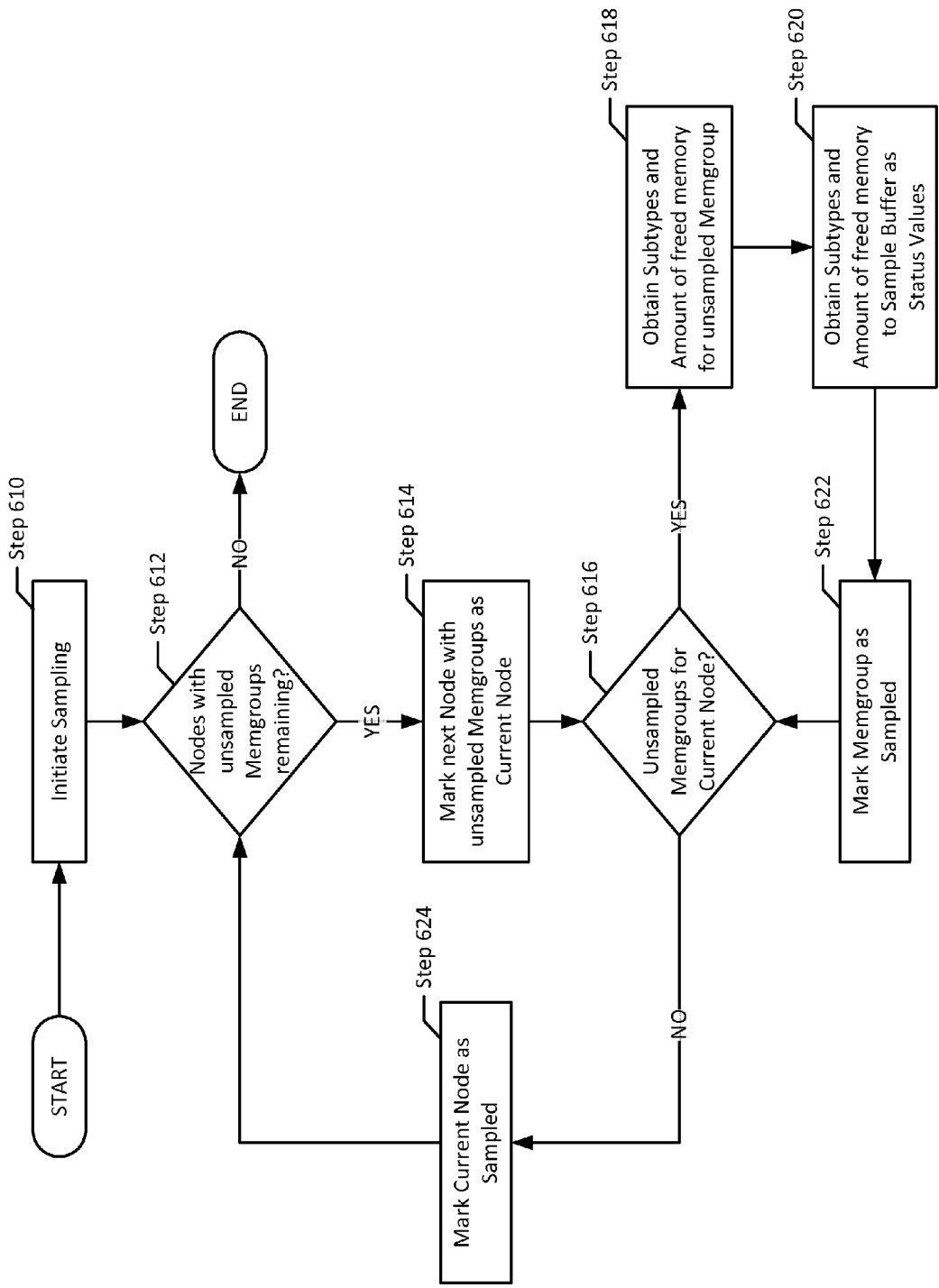
FIG. 6 shows a flow diagram in accordance with one or more embodiments of the invention.

FIG. 6 shows a flowchart for sampling a memgroup freelist repository in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

At Step 610, the prediction subsystem initiates the sampling. In one embodiment of the invention, the sampling is initiated by the expiration of a set interval of time. At Step 612, the sampler determines whether there remain nodes with unsampled memgroups during this period of sampling. If at Step 612, the sampler determines that nodes with unsampled memgroups remain, then at Step 614 the next node with unsampled memgroups is marked as the current node.

At Step 616, the sampler determines whether there remains unsampled memgroups on the current node. If at Step 616, the sampler determines that there are unsampled memgroups on the current node, then at Step 618 the sampler obtains the subtypes and amounts of the freed memory in the memgroup in the current node. At Step 620, the subtypes and amounts of the freed memory is added to the sample buffer as status values. At Step 622, the memgroup is marked as sampled.

If at Step 616, the sampler determines that there are no unsampled memgroups on the current node, then at Step 624 the sampler marks the current node as sampled, and returns to Step 612. If at Step 612, the sampler determines that no other nodes with unsampled memgroups remain, then the process ends.

Figure 7:
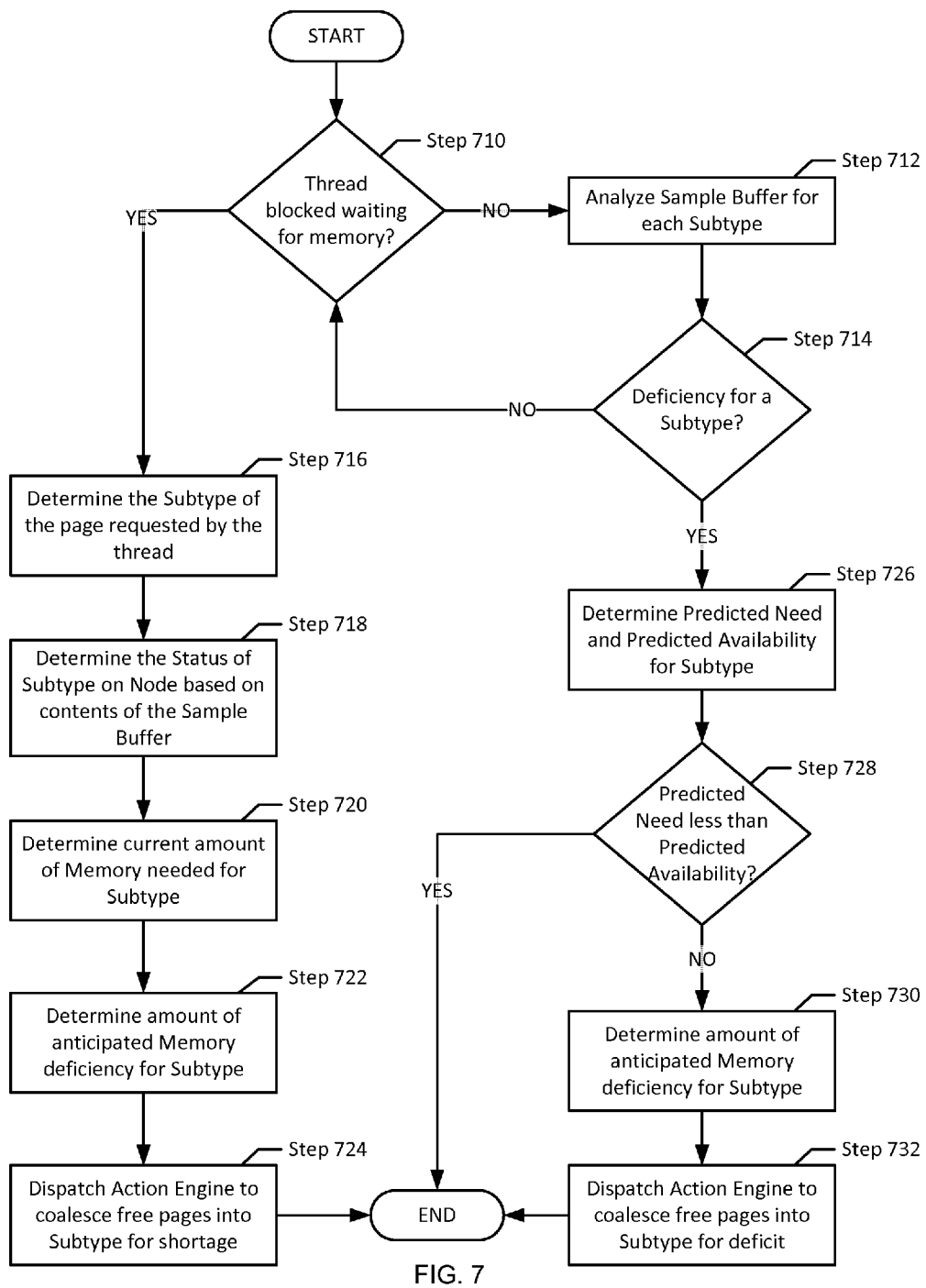
FIG. 7 shows a flow diagram in accordance with one or more embodiments of the invention.

FIG. 7 shows a flowchart for invoking an action engine by an analyzer in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

At Step 710, the analyzer determines whether a thread is blocked waiting for a memory of a certain subtype. If a thread is not currently blocked, then at Step 712, the analyzer determines analyzes the current status values in the sample buffer. In one embodiment of the invention, the analyzer periodically analyzes the contents of the sample buffer while listening for an alert that a thread is blocked waiting for memory of a specific size (i.e., a shortage exists). In one embodiment of the invention, the sample buffer includes a series of status values that represent a historical record of memory usage on the system over a period of time.

At Step 714, the analyzer determines whether a deficiency exists for any subtype based on the analysis of the sample buffer. If at Step 714, the analyzer determines that no deficiency exists, the process returns to Step 710.

If at Step 710, the analyzer determines that a thread is currently blocked (i.e., a shortage exists), then at Step 716, the analyzer determines the subtype of the memory requested by the thread. At Step 718, the analyzer analyzes the sample buffer to obtain a subtype state of the memory subtype on the node targeted by the thread.

At Step 720, the analyzer determines the amount of memory needed to satisfy the blocked thread (i.e., cure the shortage). In one embodiment of the invention, this determination is made based on the notification received by the analyzer that a thread is blocked. At Step 722, the analyzer determines whether a deficiency is predicted based on its analysis of the sample buffer. In one embodiment of the invention, a shortage may occur without a predicted deficiency if, for example, a sudden and temporary spike in demand for memory of a certain subtype. In that case, the analyzer may determine that no deficiency exists that needs to be cured. At Step 724, the action engine is dispatched to cure the shortage subtype state and the deficiency subtype state (if one exists).

If at Step 714, the analyzer determines that a deficiency does exist, then at Step 726, the analyzer calculates the predicted memory subtype requirements and predicted memory subtype availability for the anticipated period. At Step 728, the analyzer determines whether the predicted need is less than predicted availability of the memory subtype. If at Step 728, the analyzer determines that the predicted need is less than predicted availability of the memory subtype, then the process ends. If at Step 728, the analyzer determines that the predicted need is not less than predicted availability of the memory subtype, then at Step 730, the analyzer calculates the difference between the need and availability of the memory subtype to obtain the deficiency. At Step 732, the action engine is dispatched to cure the deficiency of the calculated amount by coalescing an equal amount of freed pages into pages matching the deficient subtype state.

In one or more embodiments of the invention, a determination that there is a shortage subtype state for a subtype of memory may or may not also indicate that a deficiency exists. In other words, the existence of a shortage subtype state for a subtype of memory indicates that the prediction subsystem failed to accurately predict the demand for memory of the subtype. This may have occurred because of an unpredicted increase in demand for memory of the subtype. The unpredicted increase may be temporary, in which case the analyzer may determine that no deficit exists (i.e., the anticipated demand is less than the predicted availability). The unpredicted increase may instead be longer term, in which case the analyzer may determine that a deficit does exist (i.e., the anticipated demand is greater than the predicted availability).

Figure 8:
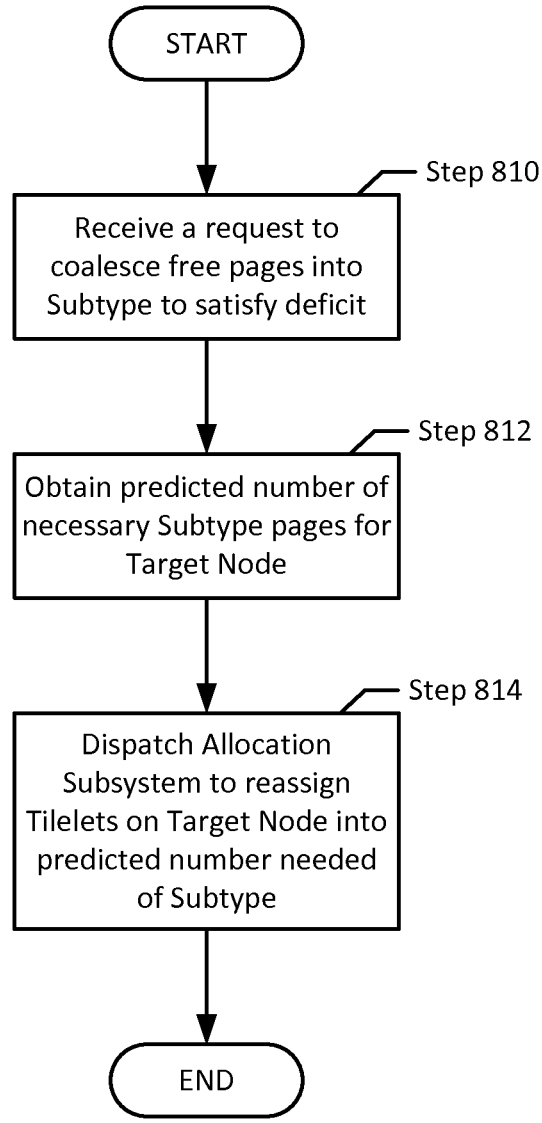
FIG. 8 shows a flow diagram in accordance with one or more embodiments of the invention.

FIG. 8 shows a flowchart for an action engine responding to a deficit in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

At Step 810, the action engine receives a request to coalesce freed pages to a specified subtype to satisfy the deficit. At Step 812, the action engine obtains the amount of the deficiency from the analyzer. At Step 814, the action engine interacts with the allocation subsystem to coalesce freed pages on tilelets to the specified amount of the specified subtype of memory.

In one embodiment of the invention, freed pages on a tilelet are coalesced by assigning a preferred page size to a tilelet on the system and maintaining the tile freelist such that pages matching the preferred page size for the associated tilelet (i.e., the in-bounds list) are allocated before other freed pages (i.e., pages in the out-of-bounds list). Doing so causes freed pages in the out-of-bounds list to remain free for longer periods of time. The amount of page entries in the out-of-bounds page freelist may then grow faster than the amount of page entries in the in-bounds page freelist. Therefore, the physical pages corresponding to the page entries in the out-of-bounds page freelists may be coalesced into larger pages. Consequently, by assigning a preferred page size in a group of tilelets to a value matching the deficient subtype of memory, the system may efficiently create pages of a required size.

Figure 9:
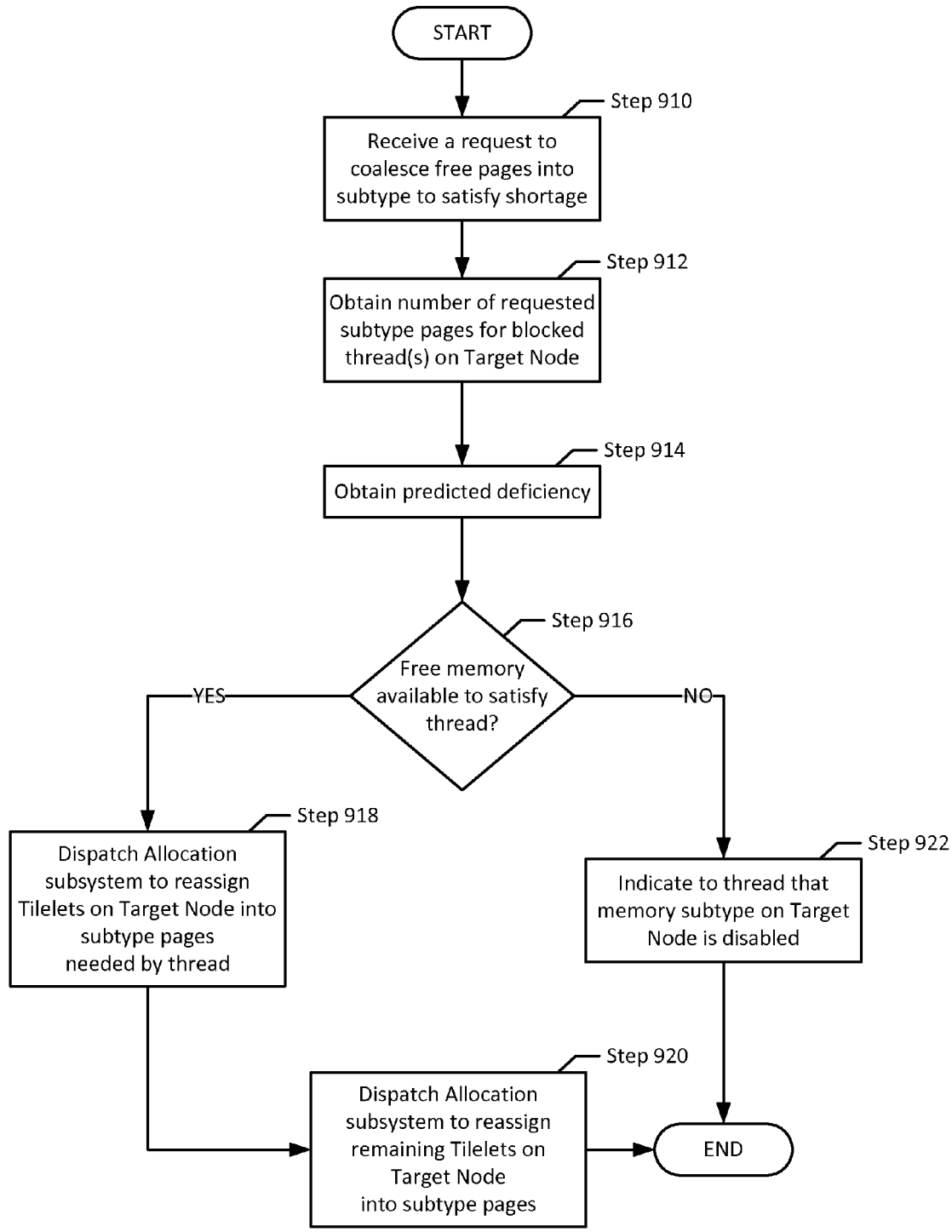
FIG. 9 shows a flow diagram in accordance with one or more embodiments of the invention.

FIG. 9 shows a flowchart for an action engine responding to a shortage in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

At Step 910, the action engine receives a request to coalesce freed pages into a specified subtype to satisfy a shortage. At Step 912, the action engine obtains the current amount of subtype memory requested by the blocked threads. At Step 914, the action engine obtains the anticipated deficiency for the subtype memory. At Step 916, the action engine determines whether there exists enough freed memory on the node to satisfy the needs of the requesting thread or threads (if that memory were coalesced into the requested subtype).

If at Step 916, the action engine determines that there exists enough freed memory on the node to satisfy the needs of the requesting thread or threads, then at Step 918, the action engine interacts with the allocation subsystem to coalesce freed pages on tilelets to the satisfy amount of the specified subtype of memory. At Step 920, the action engine interacts with the allocation subsystem to coalesce freed pages on tilelets to the specified amount of the specified subtype of memory.

If at Step 916, the action engine determines that there does not exist enough freed memory on the node to satisfy the needs of the requesting thread or threads, then at Step 922, the action engine indicates to the analyzer that the subtype state of the subtype requested is disabled. In one embodiment of the invention, the thread or threads will be notified that the subtype is disabled, and may be provided alternative means of obtaining the memory by other subsystem on the VMM.

Figure 10A:
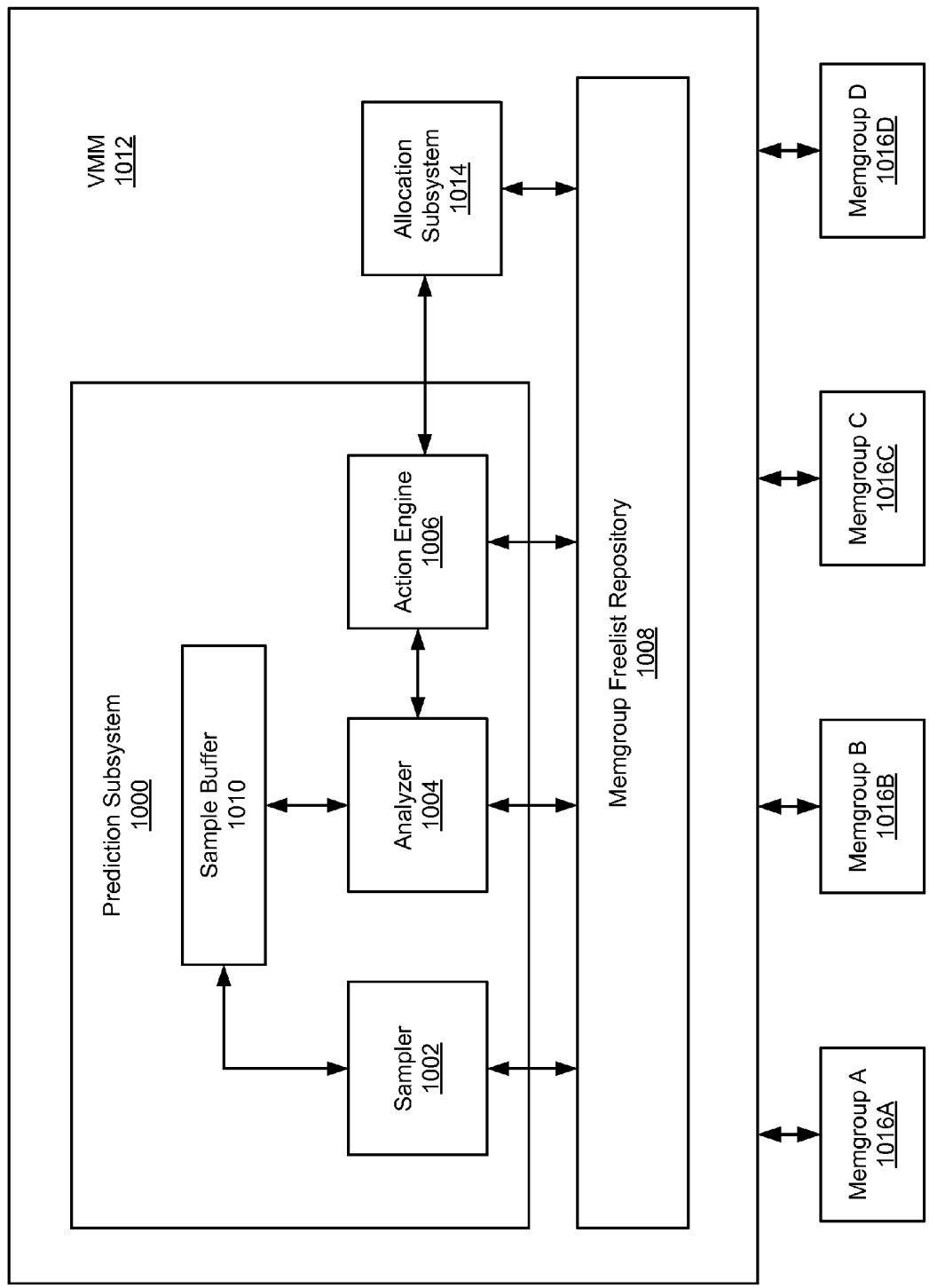
FIGS. 10A-10B show an example in accordance with one or more embodiments of the invention.
Figure 10B:
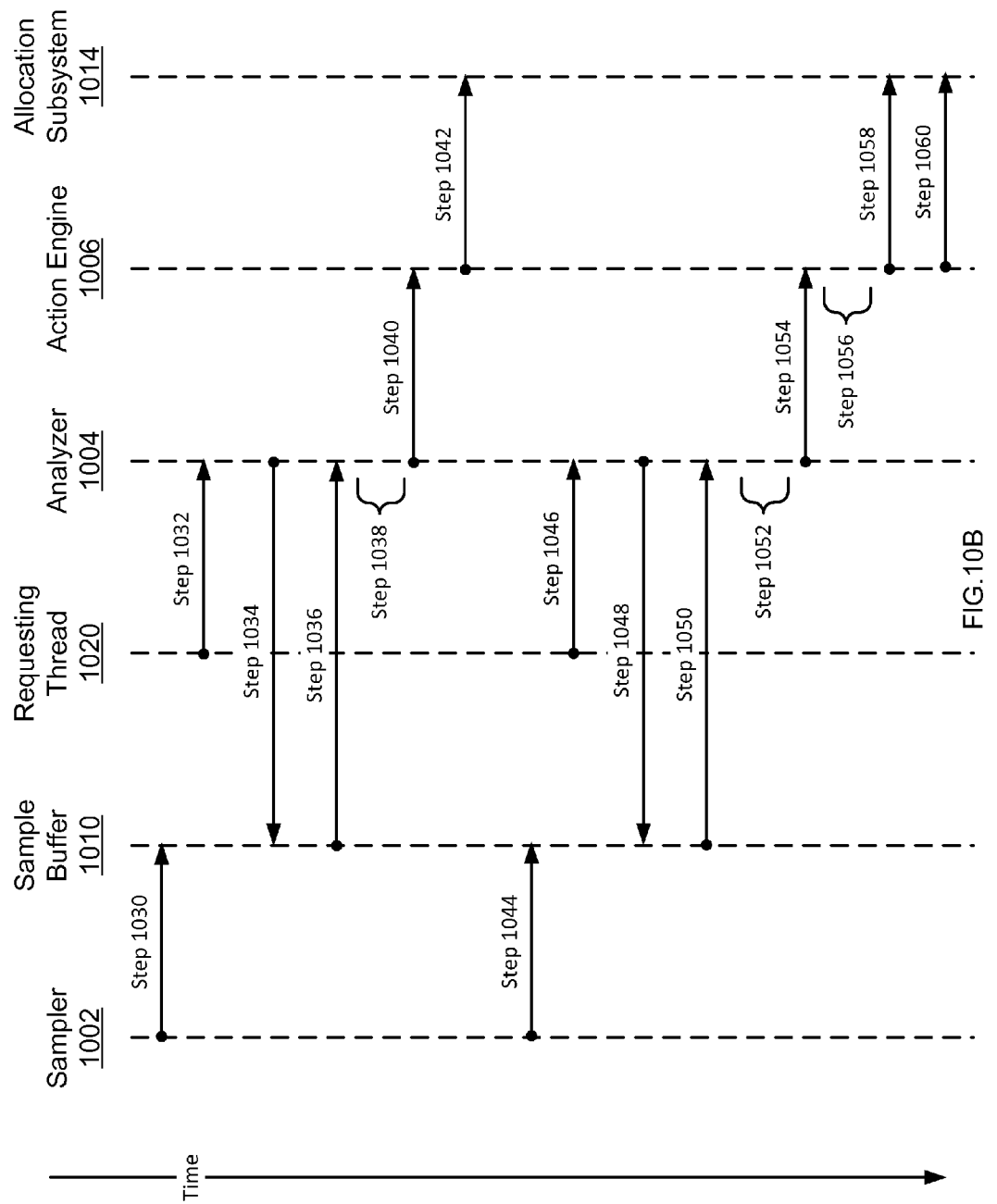

FIGS. 10A and 10B show an example in accordance with one or more embodiments of the invention. Specifically, FIG. 10A shows an example system undergoing the activities depicted in the example timeline of FIG. 10B. As shown in FIG. 10A, the VMM (1012) includes a prediction subsystem (1000), an allocation subsystem (1014), and a memgroup freelist repository (1008). The prediction subsystem (1000)

includes a sampler (1002), an analyzer (1004), an action engine (1006), and a sample buffer (1010).

At Step 1030, the sampler (1002) adds a set of status values to the sample buffer (1010). At Step 1032, the analyzer (1004) is notified that a requesting thread (1020) is blocked waiting for a memory page with a subtype of 32 kB. At Step 1034, the analyzer (1004) analyzes the content of the sample buffer (1010) to determine a subtype state of the 32 kB pages on the node executing the requesting thread (1020). At Step 1036, the analyzer (1004) receives the results of the analysis. At Step 1038, the analyzer (1004) the analyzer (1004) determines the amount of the shortage and that the anticipated need for 32 kB pages exceeds the anticipated availability of 32 kB pages by 128, indicating a deficiency of 128 32 kB pages.

At Step 1040, the analyzer (1004) indicates to the action engine (1006) that there is a deficiency of 128 32 kB pages. At Step 1042, the action engine (1006) instructs the allocation subsystem (1014) to generate 128 32 kB pages on the node executing the requesting thread (1020).

At Step 1044, the sampler (1002) adds a second set of status values to the sample buffer (1010). At Step 1046, the analyzer (1004) is notified that a requesting thread (1020) is blocked waiting for two memory pages with a subtype of 64 kB. At Step 1050, the analyzer (1004) analyzes the content of the sample buffer (1010) to determine a subtype state of the 64 kB pages on the node executing the requesting thread (1020). At Step 1052, the analyzer (1004) receives the results of the analysis. At Step 1038, the analyzer (1004) determines that there is not enough subtype pages on the node to satisfy the current need, and therefore the subtype state of 64 kB pages is a shortage. Also at Step 1052, the analyzer (1004) determines that the anticipated need for 64 kB pages exceeds the anticipated availability of 64 kB pages by 512, indicating a deficiency of 512 64 kB pages.

At Step 1054, the analyzer (1004) indicates to the action engine (1006) that there is a shortage of 512 64 kB pages. At Step 1056, the action engine (1006) determines that there exists enough freed memory on the node to satisfy the needs of the requesting thread (1020) (two 64 kB pages). At Step 1058, the action engine (1006) instructs the allocation subsystem (1014) to coalesce freed pages to two 64 kb pages. At Step 1060, the action engine (1006) instructs with the allocation subsystem (1014) to coalesce all remaining freed pages on the node to 64 kB pages.

Figure 11:
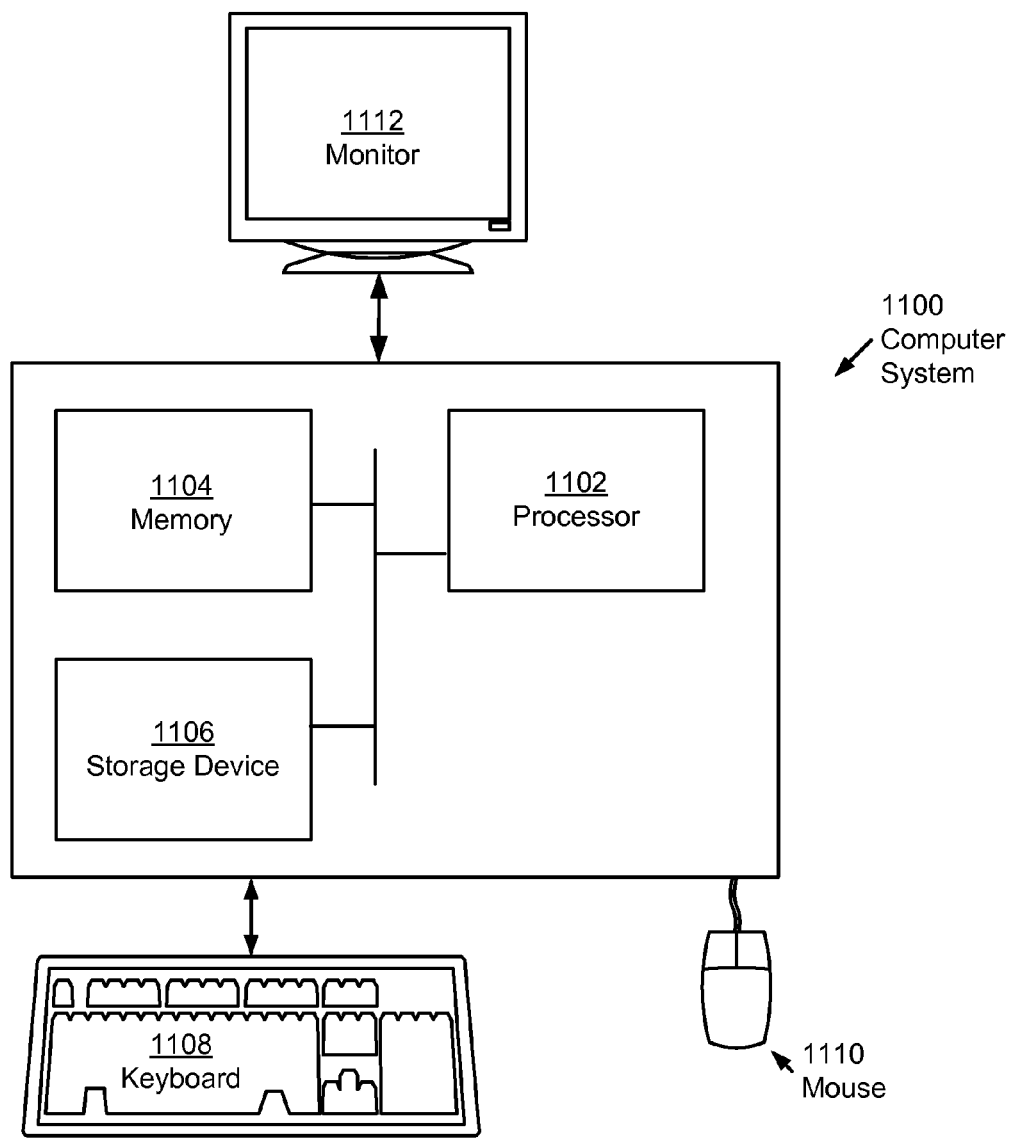
FIG. 11 shows a computer system in accordance with one or more embodiments of the invention.

Embodiments of the invention may be implemented on virtually any type of computer regardless of the platform being used. For example, as shown in FIG. 11, a computer system (1100) includes one or more processor(s) (1102) such as a central processing unit (CPU) or other hardware processor(s), associated memory (1104) (e.g., random access memory (RAM), cache memory, flash memory, etc.), a storage device (1106) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (1102) is hardware. For example, the processor may be an integrated circuit. The computer system (1100) may also include input means, such as a keyboard (1108), a mouse (1110), or a microphone (not shown). Further, the computer system (1100) may include output means, such as a monitor (1112) (e.g., a liquid crystal display (LCD), a plasma display, or cathode ray tube (CRT) monitor). The computer system (1100) may be connected to a network (1114) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (1100) includes at least the minimal processing, input, and/or output means necessary to practice embodiments of the invention.

Further, those skilled in the art will appreciate that one or more elements of the aforementioned computer system (1100) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code may be used to perform embodiments of the invention. The software instructions in the form of computer readable code may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
  memory comprising a first memgroup and a second memgroup, wherein the first memgroup comprises a first physical page and a second physical page, wherein the first physical page is a first subtype, and wherein the second physical page is a second subtype; and
  a prediction subsystem configured to:
    obtain a status value indicating an amount of freed physical pages on the memory;
    store the status value in a sample buffer comprising a plurality of previous status values;
    determine, using the status value and the plurality of previous status values, a deficiency subtype state for the first subtype, wherein the deficiency subtype state indicates an anticipated need for the first subtype on the memory; and
    instruct, based on the deficiency subtype state indicating the anticipated need for the first subtype on the memory, an allocation subsystem to coalesce the second physical page to the first subtype.

2. The system of claim 1,
  wherein the first memgroup and the second memgroup are on a node of the system, and
  wherein the prediction subsystem is further configured to:
    determine that there is a shortage of the first subtype based on receiving a notification that a thread is blocked waiting for a physical page of the first subtype; and
    instruct the allocation subsystem to coalesce, from the second memgroup, a third physical page of the first subtype.

3. The system of claim 1, wherein the status value and the plurality of previous status values indicate a surplus subtype state for the second subtype.

4. The system of claim 1, wherein the anticipated need for the first subtype on the memory is determined based on a rate of increase or decrease in need across the status value and the plurality of previous status values in the sample buffer.

5. The system of claim 1, wherein the determining the deficiency subtype state is determined in response to a notification that a thread is blocked waiting for a freed physical page of the first subtype.

6. The system of claim 1, wherein the first subtype comprises a physical page size.

7. The system of claim 1, wherein the system has a non-uniform memory access architecture.

8. A method for managing memory on a system comprising:
  obtaining a status value indicating an amount of freed physical pages on the memory,
    wherein the memory comprises a first memgroup and a second memgroup,
    wherein the first memgroup comprises a first physical page and a second physical page,
    wherein the first physical page is a first subtype, and
    wherein the second physical page is a second subtype;
  storing the status value in a sample buffer comprising a plurality of previous status values;
  determining, using the status value and the plurality of previous status values, a deficiency subtype state for the first subtype, wherein the deficiency subtype state indicates an anticipated need for the first subtype on the memory; and
  instructing, based on the deficiency subtype state indicating the anticipated need for the first subtype on the memory, an allocation subsystem to coalesce the second physical page to the first subtype.

9. The method of claim 8,
  wherein the first memgroup and the second memgroup are on a node on the system, and
  wherein the prediction subsystem is further configured to:
    determine that there is a shortage of the first subtype based on receiving a notification that a thread is blocked waiting for a physical page of the first subtype; and
    instruct the allocation subsystem to coalesce, from the second memgroup, a third physical page of the first subtype.

10. The method of claim 8, wherein the status value and the plurality of previous status values indicate a surplus subtype state for the second subtype.

11. The method of claim 8, wherein the anticipated need for the first subtype on the memory is determined based on a rate of increase or decrease in need across the status value and the plurality of previous status values in the sample buffer.

12. The method of claim 8, wherein the determining the deficiency subtype state is determined in response to a notification that a thread is blocked waiting for a freed physical page of the first subtype.

13. The method of claim 8, wherein the first subtype comprises a physical page size.

14. The method of claim 8, wherein the memory resides on a system has a non-uniform memory access architecture.

15. A non-transitory computer readable medium comprising instructions that, when executed by a processor, perform a method for managing memory on a system, the method comprising:
  obtaining a status value indicating an amount of freed physical pages on the memory,
    wherein the memory comprises a first memgroup and a second memgroup,
    wherein the first memgroup comprises a first physical page and a second physical page,
    wherein the first physical page is a first subtype, and
    wherein the second physical page is a second subtype;
  storing the status value in a sample buffer comprising a plurality of previous status values;
  determining, using the status value and the plurality of previous status values, a deficiency subtype state for the first subtype, wherein the deficiency subtype state indicates an anticipated need for the first subtype on the memory; and
  instructing, based on the deficiency subtype state indicating the anticipated need for the first subtype on the memory, an allocation subsystem to coalesce the second physical page to the first subtype.

16. The non-transitory computer readable medium of claim 15,
  wherein the first memgroup and the second memgroup are on a node of the system, and
  wherein the prediction subsystem is further configured to:
    determine that there is a shortage of the first subtype based on receiving a notification that a thread is blocked waiting for a physical page of the first subtype; and
    instruct the allocation subsystem to coalesce, from the second memgroup, a third physical page of the first subtype.

17. The non-transitory computer readable medium of claim 15, wherein the status value and the plurality of previous status values indicate a surplus subtype state for the second subtype.

18. The non-transitory computer readable medium of claim 15, wherein the anticipated need for the first subtype on the memory is determined based on a rate of increase or decrease in need across the status value and the plurality of previous status values in the sample buffer.

19. The non-transitory computer readable medium of claim 15, wherein the determining the deficiency subtype state is determined in response to a notification that a thread is blocked waiting for a freed physical page of the first subtype.

20. The non-transitory computer readable medium of claim 15, wherein the first subtype comprises a physical page size.

* * * * *